(12) United States Patent
Miller

(10) Patent No.: US 10,285,540 B1
(45) Date of Patent: May 14, 2019

(54) HIGH VOLUME FRIER/BRAZIER SYSTEM

(71) Applicant: Alvin Miller, St. Petersburg, FL (US)

(72) Inventor: Alvin Miller, St. Petersburg, FL (US)

( * ) Notice: Subject to any disclaimer, the term of this patent is extended or adjusted under 35 U.S.C. 154(b) by 0 days.

(21) Appl. No.: 15/283,986

(22) Filed: Oct. 3, 2016

Related U.S. Application Data

(63) Continuation-in-part of application No. 15/259,680, filed on Sep. 8, 2016, now abandoned.

(60) Provisional application No. 62/259,396, filed on Nov. 24, 2015.

(51) Int. Cl.
*A47J 37/12* (2006.01)

(52) U.S. Cl.
CPC ....... *A47J 37/1276* (2013.01); *A47J 37/1247* (2013.01); *A47J 37/1266* (2013.01); *A47J 37/1295* (2013.01)

(58) Field of Classification Search
CPC ................ A47J 37/1219; A47J 37/1276; A47J 37/1247; A47J 37/1266; A47J 37/1295
USPC ......... 99/400, 417, 403, 415, 402, 410, 413, 99/339, 385, 399
See application file for complete search history.

(56) References Cited

U.S. PATENT DOCUMENTS

| | | | | |
|---|---|---|---|---|
| 4,913,039 A | * | 4/1990 | Sutphen | A47J 37/0704 99/339 |
| 2003/0047178 A1 | * | 3/2003 | Barth | A47J 37/0713 126/41 R |
| 2004/0112226 A1 | * | 6/2004 | Johnston | A47J 37/0704 99/339 |
| 2014/0319438 A1 | * | 10/2014 | Carlson | B62B 3/02 254/2 R |

* cited by examiner

*Primary Examiner* — Phuong T Nguyen

(57) ABSTRACT

A drum has an upper edge and a lower edge. The drum has an open top and a closed bottom with a floor. The drum has a cylindrical side wall with a 12 o'clock region forwardly, a 6 o'clock region rearwardly, a 3 o-clock region to a first side, and a 9 o'clock region to a second side. A propane tank is positioned within the drum supported upon the floor. A container for food to be cooked is supported by the drum adjacent to the upper edge of the drum. The container extends downwardly into the drum. A burner is positioned within the drum above the propane tank and below the container. A tube couples the burner to the propane tank.

6 Claims, 5 Drawing Sheets

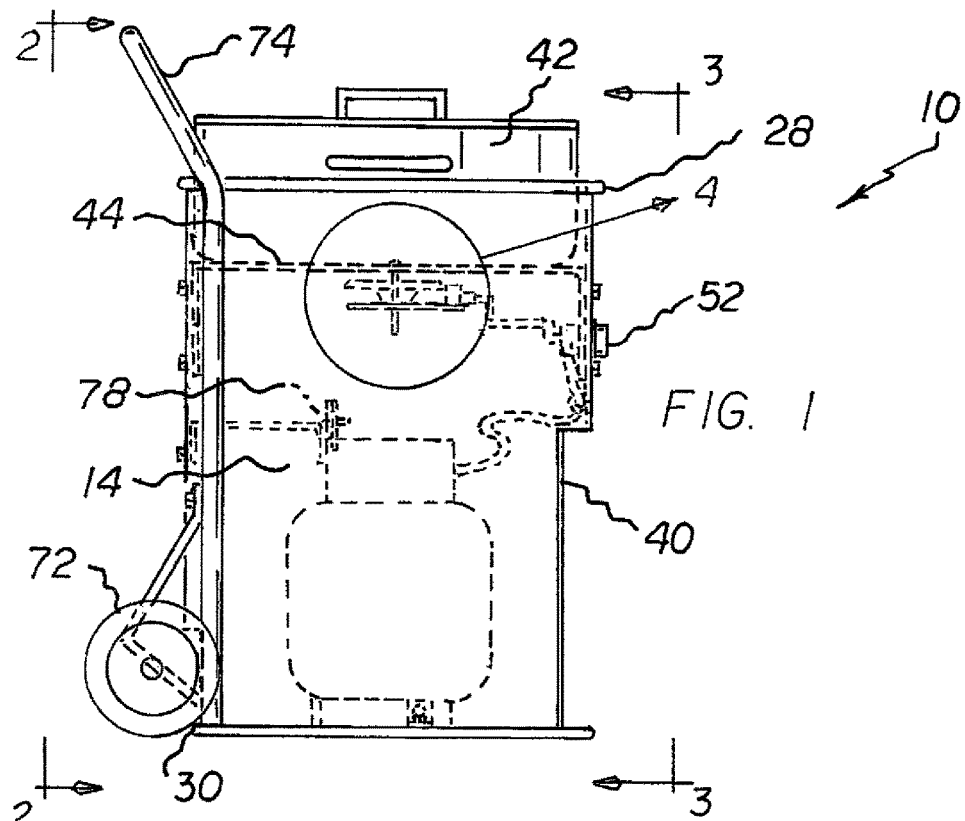
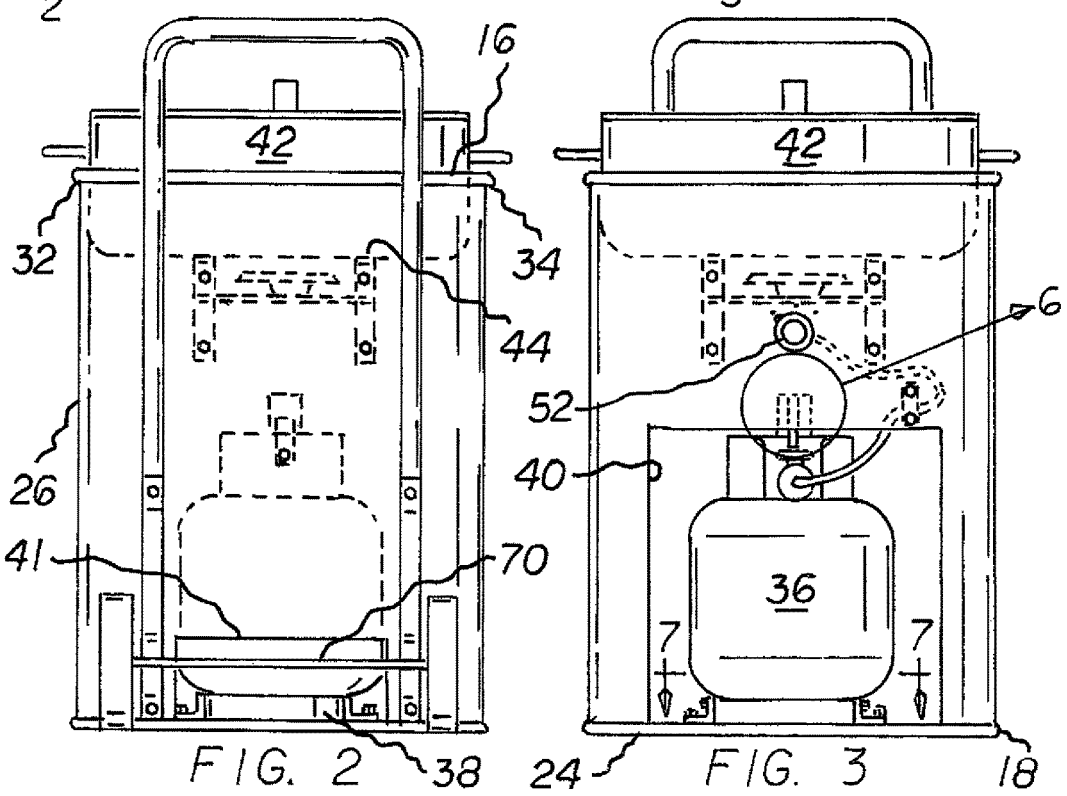
FIG. 1
FIG. 2
FIG. 3

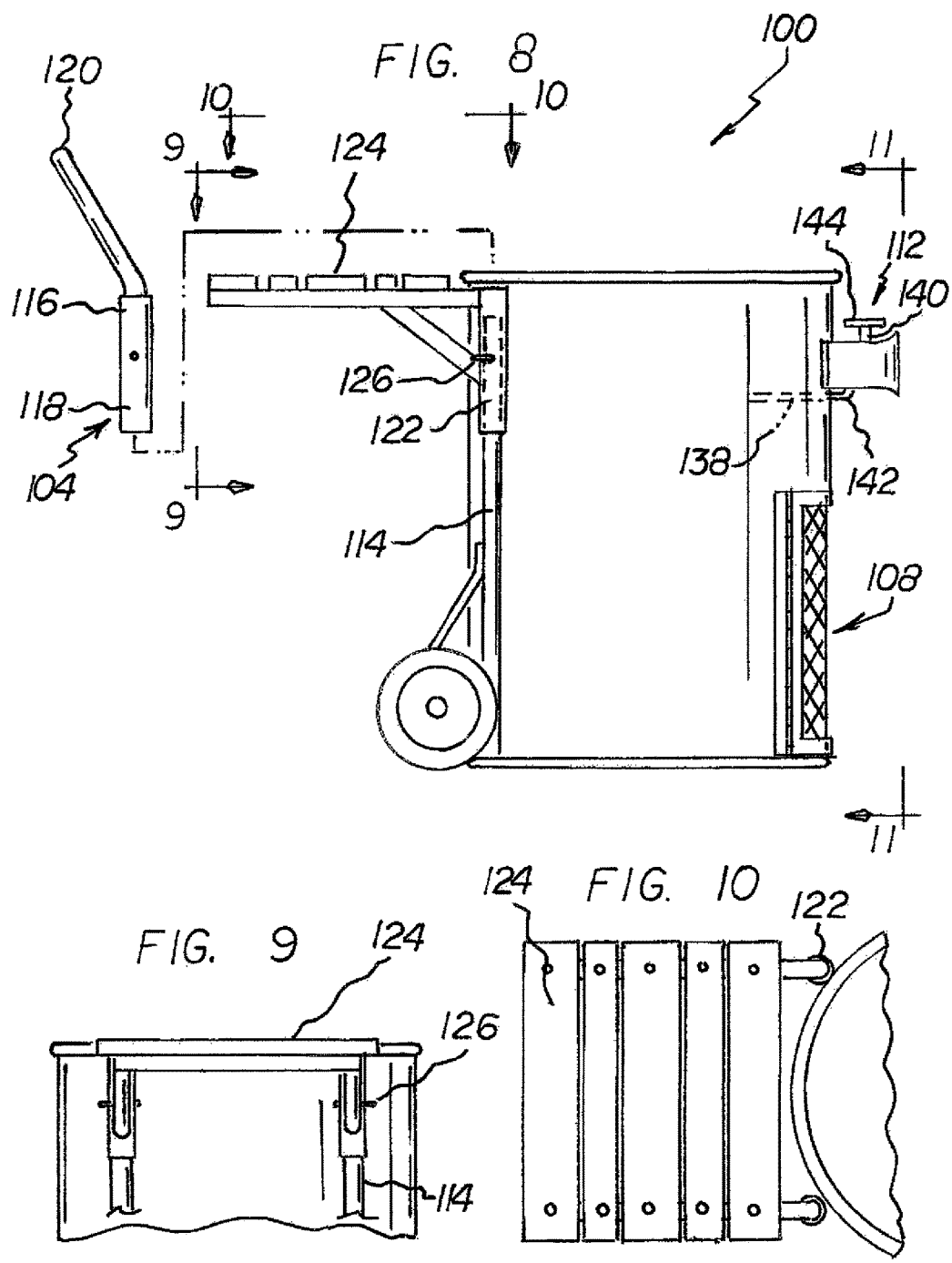

HIGH VOLUME FRIER/BRAZIER SYSTEM

RELATED APPLICATION

The present application is based upon Provisional Application No. 62/259,396 filed Nov. 24, 2015, the subject matter of which is incorporated herein by reference and the priority of which is claimed.

BACKGROUND OF THE INVENTION

Field of the Invention

The present invention relates to a high volume frier/brazier system and more particularly pertains to generating a heating area and for cooking in a removable container above the heating area. The generating and cooking are done in a safe, convenient, and economical manner.

Description of the Prior Art

The use of frier and brazier systems of known designs and configurations is known in the prior art. More specifically, frier and brazier systems of known designs and configurations previously devised and utilized for the purpose of frying and brazing food are known to consist basically of familiar, expected, and obvious structural configurations, notwithstanding the myriad of designs encompassed by the crowded prior art which has been developed for the fulfillment of countless objectives and requirements.

While these devices fulfill their respective, particular objectives and requirements, they do not describe a high volume frier/brazier system that allows generating a heating area and for cooking in a removable container above the heating area. The generating and cooking are done in a safe, convenient, and economical manner.

In this respect, the high volume frier/brazier system according to the present invention substantially departs from the conventional concepts and designs of the prior art, and in doing so provides an apparatus primarily developed for the purpose of generating a heating area and for cooking in a removable container above the heating area. The generating and cooking are done in a safe, convenient, and economical manner.

Therefore, it can be appreciated that there exists a continuing need for a new and improved high volume frier/brazier system which can be used for generating a heating area and for cooking in a removable container above the heating area. The generating and cooking are done in a safe, convenient, and economical manner. In this regard, the present invention substantially fulfills this need.

SUMMARY OF THE INVENTION

In view of the disadvantages inherent in the known types of frier and brazier systems of known designs and configurations now present in the prior art, the present invention provides an improved high volume frier/brazier system. As such, the general purpose of the present invention, which will be described subsequently in greater detail, is to provide a new and improved high volume frier/brazier system and method which has all the advantages of the prior art and none of the disadvantages.

To attain this, for a broad perspective, the present invention essentially comprises a high volume frier/brazier. A drum has an upper edge and a lower edge. The drum has an open top and a closed bottom with a floor. The drum has a cylindrical side wall with 12 o'clock region forwardly, a 6 o'clock region rearwardly, a 3 o-clock region to a first side, and a 9 o'clock region to a second side. A propane tank is positioned within the drum supported upon the floor. A container for food to be cooked is supported by the drum adjacent to the upper edge of the drum. The container extends downwardly into the drum. A burner is positioned within the drum above the propane tank and below the container. A tube couples the burner to the propane tank.

There has thus been outlined, rather broadly, the more important features of the invention in order that the detailed description thereof that follows may be better understood and in order that the present contribution to the art may be better appreciated. There are, of course, additional features of the invention that will be described hereinafter and which will form the subject matter of the claims attached.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of descriptions and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

It is therefore an object of the present invention to provide a new and improved high volume frier/brazier system which has all of the advantages of the prior art frier and brazier systems of known designs and configurations and none of the disadvantages.

It is another object of the present invention to provide a new and improved high volume frier/brazier system which may be easily and efficiently manufactured and marketed.

It is a further object of the present invention to provide a new and improved high volume frier/brazier system which is of durable and reliable constructions.

An even further object of the present invention is to provide a new and improved high volume frier/brazier system which is susceptible of a low cost of manufacture with regard to both materials and labor, and which accordingly is then susceptible of low prices of sale to the consuming public, thereby making such high volume frier/brazier system economically available to the buying public.

Lastly, it is an object of the present invention to provide a high volume frier/brazier system for generating a heating area and for cooking in a removable container above the heating area. The generating and cooking are done in a safe, convenient, and economical manner.

These together with other objects of the invention, along with the various features of novelty which characterize the invention, are pointed out with particularity in the claims annexed to and forming a part of this disclosure.

For a better understanding of the invention, its operating advantages and the specific objects attained by its uses, reference should be had to the accompanying drawings and descriptive matter in which there is illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 1 is a side elevational view of a high volume frier/brazier system constructed in accordance with the principles of the present invention.

FIG. 2 is a rear elevational view taken along line 2-2 of FIG. 1.

FIG. 3 is a front elevational view taken along line 3-3 of FIG. 1.

FIG. 8 is a side elevational view of a high volume frier/brazier system constructed in accordance with the primary embodiment of the present invention.

FIG. 9 is a rear elevational view taken along line 9-9 of FIG. 8.

FIG. 10 is a plan view taken along line 10-10 of FIG. 8.

The same reference numerals refer to the same parts throughout the various Figures.

DESCRIPTION OF THE PREFERRED EMBODIMENT

Figure 4:
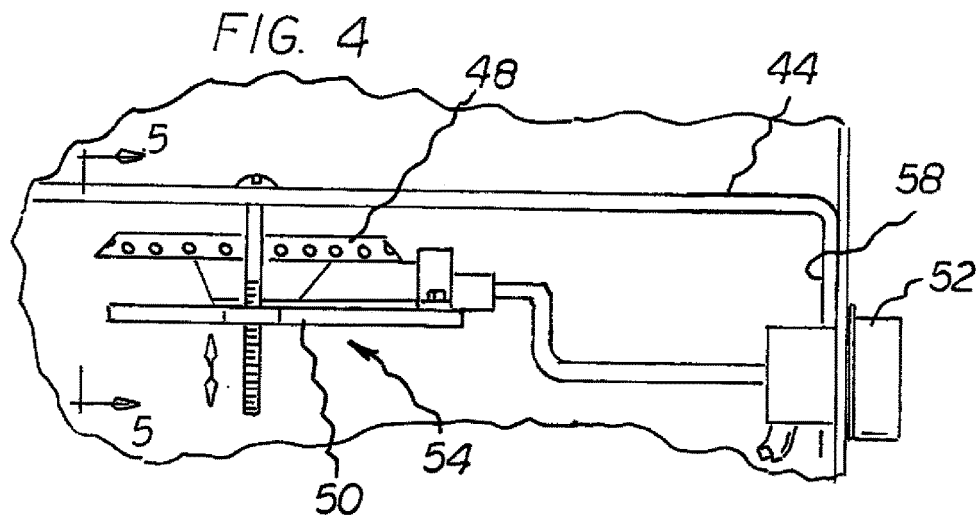
FIG. 4 is an enlarged side view taken at circle 4 of FIG. 1.
Figure 5:
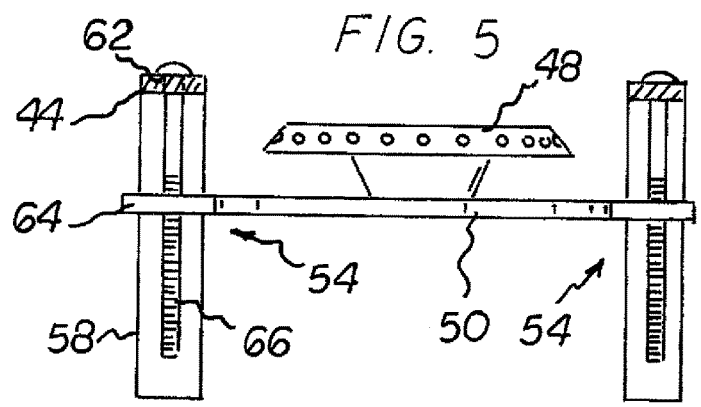
FIG. 5 is an enlarged side elevational view taken along line 5-5 of FIG. 4.
Figure 6:
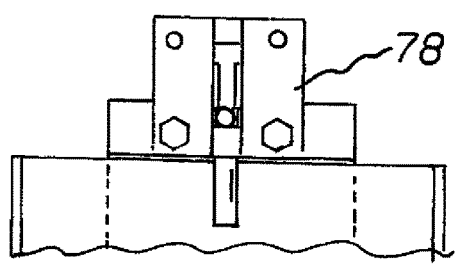
FIG. 6 is an enlarged side view taken at circle 4 of FIG. 3.
Figure 7:
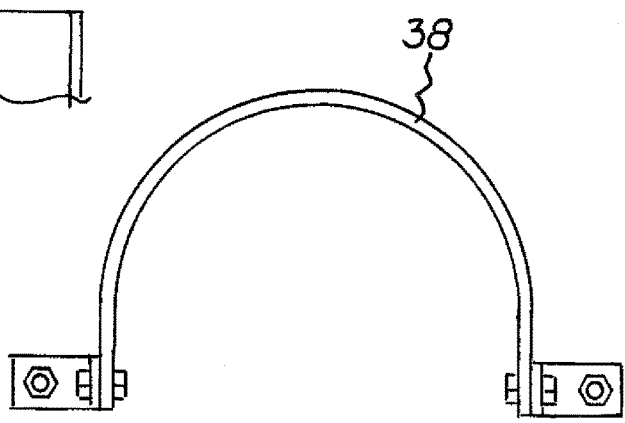
FIG. 7 is an enlarged plan view taken along line 7-7 of FIG. 3.

With reference now to the drawings, and in particular to FIG. 1 thereof, the preferred embodiment of the new and improved high volume frier/brazier system embodying the principles and concepts of the present invention and generally designated by the reference numeral 10 will be described.

The present invention, the high volume frier/brazier system 10 is comprised of a plurality of components. Such components in their broadest context include a drum, a propane tank, a container, and a burner. Such components are individually configured and correlated with respect to each other so as to attain the desired objective.

From a specific perspective, the invention of the present application is a high volume frier/brazier system 10 for generating a heating area and for cooking in a removable container above the heating area. The generating and the cooking are done in a safe, convenient, and economical manner. First provided in the system is a 55 gallon drum 14. The drum has a circular upper edge 16 and a circular lower edge 18 separated by a height of 34.5 inches. The drum has a diameter of 23 inches. The drum has an open top 20 and a closed bottom 22 with a lower floor 24. The drum has a cylindrical side wall 26 with a 12 o'clock region 28 forwardly, a 6 o'clock region 30 rearwardly, a 9 o'clock region 32 to a first side, and a 3 o'clock region 34 to a second side.

Next provided is a propane tank 36. The propane tank is positioned within the drum supported upon the floor. A lower support 38 in a C-shaped configuration is coupled to the floor and supports the propane tank. A side opening 40 in the side wall of the drum facilitates changing the propane tank. A lower opening 41 is for ventilation purposes.

A container 42 for food to be cooked is next provided. An upper support 44 is provided for supporting the container adjacent to the upper edge of the drum. The container extends downwardly into the drum.

Next provided is a burner 48. The burner is positioned within the drum. An intermediate support 50 is provided supporting the burner above the propane tank and below the container. A control knob 52 functions to vary the amount of propane to the burner for heat control purposes.

An adjustment assembly 54 is next provided. The adjustment assembly includes two laterally spaced brackets 56 having vertical end sections 58 attached to the side wall of the drum. The two laterally spaced brackets have horizontal sections 60 constituting the upper support for the container. An unthreaded aperture 62 is provided in each horizontal section of the two laterally spaced brackets. Two threaded apertures 64 are provided in the intermediate support. Two threaded adjustment bolts 66 extend through the unthreaded apertures and are threadedly coupled to the two threaded apertures. In this manner, rotation of the two adjustment bolts will raise and lower the intermediate support and the burner to vary the distance of the burner and the container.

Next provided is an axle 70 adjacent to the 6 o'clock region of the drum. Two wheels 72 are rotatably supported on the axle to facilitate moving of the system. A handle 74 is provided on the drum adjacent to the upper edge at the 12 o'clock region. A hold down assembly 78 within the drum is attached to the side wall of the drum and is removably coupled to the propane tank for securement purposes.

The primary embodiment of the present invention is a system 100 similar to the above described embodiment except for three improved features: the handle/table assembly 104, the door assembly 108, and the control assembly 112.

The handle/table assembly 104 is illustrated in FIGS. 8, 9 and 10. Such assembly includes wheel tubes 114 extending vertically along the drum. The wheel tubes have free upper ends. A handle component 116 with downwardly extending handle ends is removably positioned on the free upper ends of the wheel tubes. The handle component has an upper end with a horizontal grip 120. A table component 122 with downwardly extending table ends is removably positioned on the free upper ends of the wheel tubes. The table component has an upper end with a horizontally disposed table 124. Pins 126 extend through the handle ends and the table ends and the wheel tubes for securement purposes.

Figure 11:
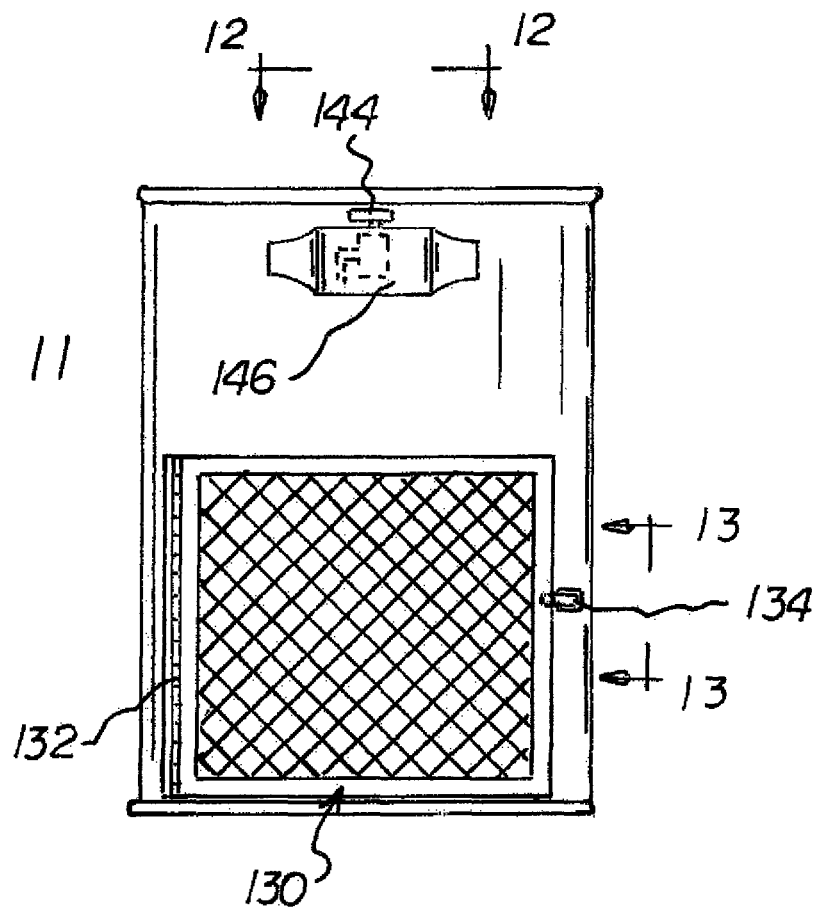
FIG. 11 is a front elevational view taken along line 11-11 of FIG. 8.
Figure 13:
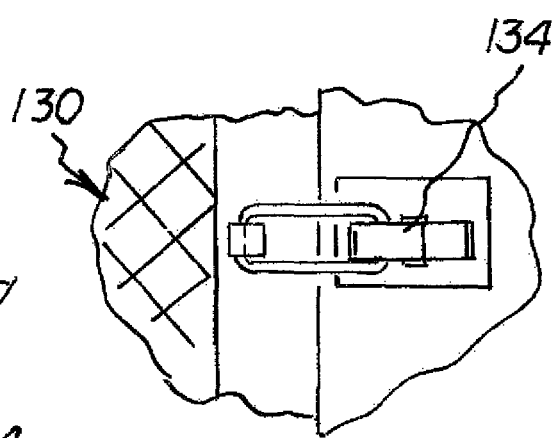
FIG. 13 is a side elevational view taken along line 13-13 of FIG. 11.

The door assembly 108 is illustrated in FIGS. 8, 11, and 13. Such assembly includes a door 130 in a partially cylindrical configuration covering a side opening in the drum. The door has apertures for ventilation. The door has an inner edge with a hinge 132 pivotably coupling the door to the container. The door has an outer edge with a larch 134 for securing the door in a closed orientation.

Figure 12:
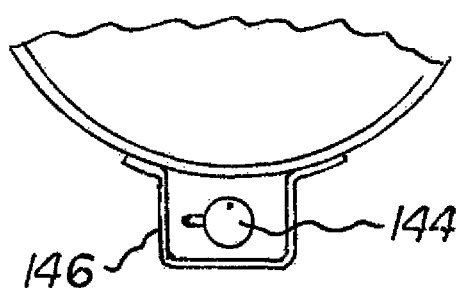
FIG. 12 is a plan view taken along line 12-12 of FIG. 11.

The control assembly 112 is illustrated in FIGS. 8, 11, and 12. Such assembly includes a horizontal interior tube 138, a vertical exterior tube 140, and an angle tube 142 there between. A dial 144 faces upwardly from the vertical exterior component for twisting to control the flame and the cooking temperature. A cover 146 protects the tubes and the dial.

Figure 14:
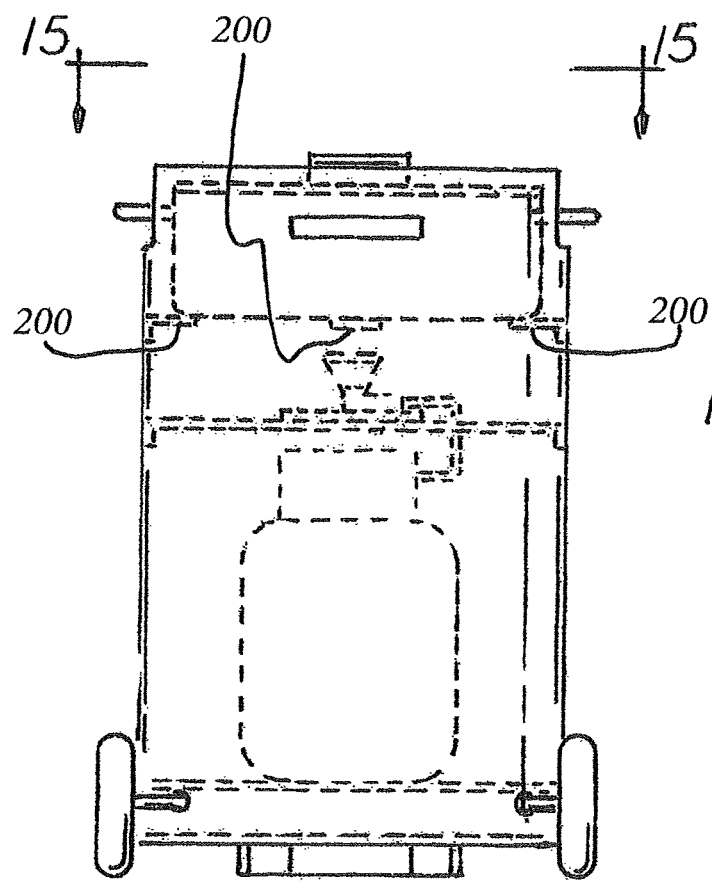
FIG. 14 is a rear elevational view similar to FIG. 2 but illustrating an alternate embodiment of the invention.
Figure 15:
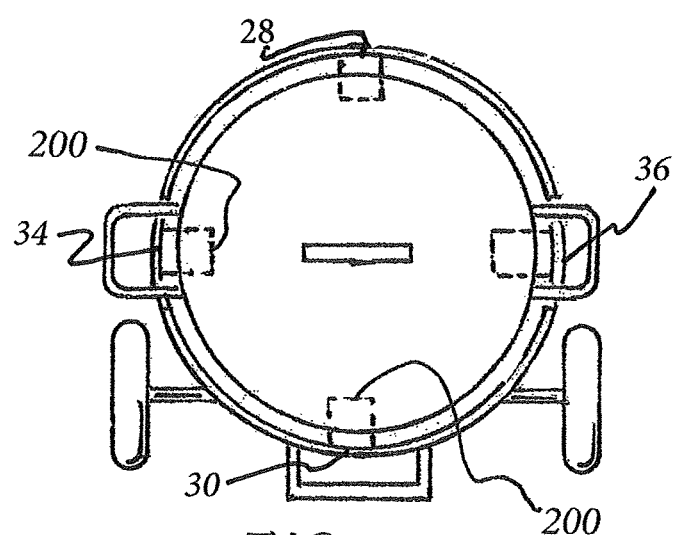
FIG. 15 is a plan view taken along line 15-15 of FIG. 14.

An alternate embodiment of the invention is shown in FIGS. 14 and 15. In this embodiment, the upper support includes a plurality of fingers (200). Each finger is in an inverted L-shaped configuration for supporting the container peripherally.

As to the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as being new and desired to be protected by Letters Patent of the United States is as follows:

1. A high volume frier/brazier system comprising:
    a drum having an upper edge and a lower edge, the drum having an open top and a closed bottom with a floor, the drum having a cylindrical side wall with a 12 o'clock region forwardly, a 6 o'clock region rearwardly, a 3 o-clock region to a first side, and a 9 o'clock region to a second side;
    a propane tank positioned within the drum supported upon the floor;
    a container for food to be cooked, the container being supported by the drum adjacent to the upper edge, the container extending downwardly into the drum;
    a burner positioned within the drum above the propane tank and below the container, a tube coupling the burner to the propane tank; and
    two laterally spaced brackets having vertical end sections attached to the side wall of the drum, the two laterally spaced brackets having horizontal sections constituting an upper support for the container, an unthreaded aperture in each horizontal section of the two laterally spaced brackets, and intermediate support supporting the burner, two threaded apertures in the intermediate support, and two threaded adjustment bolts extending through the unthreaded apertures and threadedly coupled to the two threaded apertures whereby rotation of the two adjustment bolts will raise the intermediate support and the burner to vary the distance of the burner and the container.

2. The system (100) as set forth in claim 1 and further including a handle/table assembly (104), the handle/table assembly having wheel tubes (114) extending vertically along the drum, the wheel tubes having free upper ends, a handle component (116) with downwardly extending handle ends removably positioned on the free upper ends of the wheel tubes, the handle component having an upper end with a horizontal grip (120), a table component (122) with downwardly extending table ends removably positioned on the free upper ends of the wheel tubes, the table component having an upper end with a horizontally disposed table (124), pins (126) extending through the handle ends and the table ends and the wheel tubes for securement purposes.

3. The system as set forth in claim 1 and further including a door assembly (108), the door assembly having a door (130) in a partially cylindrical configuration covering a side opening in the drum, the door having apertures for ventilation, the door having an inner edge with a hinge (132) pivotably coupling the door to the container, the door having an outer edge with a latch (134) for securing the door in a closed orientation.

4. The system as set forth in claim 1 and further including a control assembly (112), the control assembly having a horizontal interior tube (138) and a vertical exterior tube (140) and an angle tube (142) there between, a dial (144) facing upwardly from the vertical exterior component for twisting to control the flame and the cooking temperature, a cover (146) protecting the tubes and the dial.

5. The system as set forth in claim claim 1 wherein the upper support includes a plurality of fingers (200), each finger being in an inverted L-shaped configuration for supporting the container peripherally.

6. A high volume frier/brazier system (10) for generating a heating area and for cooking in a removable container above the heating area, the system comprising, in combination:
    a 55 gallon drum (14) having a circular upper edge (16) and a circular lower edge (18) separated by a height of 34.5 inches with a diameter of 23 inches, the drum having an open top (20) and a closed bottom (22) with a lower floor (24), the drum having a cylindrical side wall (26) with a 12 o'clock region (28) forwardly, and a 6 o'clock region (30) rearwardly, and a 9 o'clock region (32) to a first side, and a 3 o'clock region (34) to a second side;
    a propane tank (36) positioned within the drum supported upon the floor, a lower support (38) in a C-shaped configuration coupled to the floor and supporting the propane tank, a side opening (40) in the side wall of the drum to facilitate changing the propane tank, a lower opening (0.41) for ventilation purposes;
    a container (42) for food to be cooked, two laterally spaced brackets (44) for supporting the container adjacent to the upper edge, the container extending downwardly into the drum;
    a burner (48) positioned within the drum, an intermediate support (50) supporting the burner above the propane tank and below the container, a control knob (52) functioning to vary the amount of propane to the burner for heat control purposes; and
    an adjustment assembly (54) including the two laterally spaced brackets (44) having vertical end sections (58) attached to the side wall of the drum, an unthreaded aperture (62) in each of the two laterally spaced brackets, two threaded apertures (64) in the intermediate support, and two threaded adjustment bolts (66) extending through the unthreaded apertures and threadedly coupled to the two threaded apertures whereby rotation of the two adjustment bolts will raise and lower the intermediate support and the burner to vary the distance of the burner and the container; and
    an axle (70) adjacent to the 6 o'clock region of the drum, two wheels (72) rotatably supported on the axle to facilitate moving of the system, a handle (74) on the drum adjacent to the upper edge at the 12 o'clock region, a hold down assembly (78) within the drum attached to the side wall of the drum and removably coupled to the propane tank for securement purposes, a handle/table assembly (104), the handle/table assembly having wheel tubes (114) extending vertically along the drum, the wheel tubes having free upper ends, a handle component (116) with downwardly extending handle ends removably positioned on the free upper ends of the wheel tubes, the handle component having an upper end with a horizontal grip (120), a table component (122) with downwardly extending table ends removably positioned on the free upper ends of the wheel tubes, the table component having an upper end with a horizontally disposed table (124), pins (126) extending through the handle ends and the table ends and the wheel tubes for securement purposes;

a door assembly (108), the door assembly having a door (130) in a partially cylindrical configuration covering a side opening in the drum, the door having apertures for ventilation, the door having an inner edge with a hinge (132) pivotably coupling the door to the container, the door having an outer edge with a latch (134) for securing the door in a closed orientation; and a control assembly (112), the control assembly having a horizontal interior tube (138) and a vertical exterior tube (140) and an angle tube (142) there between, a dial (144) facing upwardly from the vertical exterior tube for twisting to control the flame and the cooking temperature; and a cover (146) protects the tube and the dial.

\* \* \* \* \*